United States Patent
Mao

(10) Patent No.: US 9,531,279 B2
(45) Date of Patent: Dec. 27, 2016

(54) POWER SUPPLY CONTROLLER WITH MINIMUM-SUM MULTI-CYCLE MODULATION

(71) Applicant: Power Integrations, Inc., San Jose, CA (US)

(72) Inventor: Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 199 days.

(21) Appl. No.: 14/220,513

(22) Filed: May 5, 2014

(65) Prior Publication Data

US 2014/0233274 A1  Aug. 21, 2014

Related U.S. Application Data

(63) Continuation of application No. 13/242,947, filed on Sep. 23, 2011, now Pat. No. 8,693,217.

(51) Int. Cl.
*H02M 3/335* (2006.01)
*H02M 1/00* (2006.01)

(52) U.S. Cl.
CPC . *H02M 3/33523* (2013.01); *H02M 2001/0035* (2013.01); *Y02B 70/16* (2013.01)

(58) Field of Classification Search
CPC ................ H02M 3/33523; H02M 3/28; H02M 2001/0035; H02M 3/335

(Continued)

(56) References Cited

U.S. PATENT DOCUMENTS

| 4,694,386 A | 9/1987 | de Sartre |
| 4,937,727 A | 6/1990 | Leonardi |

(Continued)

FOREIGN PATENT DOCUMENTS

| CN | 1404649 A | 3/2003 |
| CN | 1677814 A | 10/2005 |

(Continued)

OTHER PUBLICATIONS

"Taylorbrite Dimmers," Navigating Innovation, Taylor Made Products, http://www.taylormadeproducts.com/taylorbrite/dimmers.htm, Accessed Apr. 24, 2006; pp. 1-2.

(Continued)

*Primary Examiner* — Gary L Laxton
*Assistant Examiner* — Kyle J Moody
(74) *Attorney, Agent, or Firm* — Blakely Sokoloff Taylor & Zafman LLP

(57) ABSTRACT

An example power supply controller includes a signal separator circuit that generates a feedback signal. An error signal generator generates an error signal in response to the feedback signal. A control circuit generates a drive signal in response to the error signal. The drive signal controls switching of a switch. A multi-cycle modulation circuit is included in the control circuit and generates a skip signal in response to a start skip signal, a stop skip signal and a skip mask signal. The skip mask signal is generated in response to the skip signal. The start skip and stop skip signals cause the drive signal to start skipping or stop skipping, respectively, on-time intervals of cycles. The skip mask signal disables the start skip signal from causing the drive signal to start skipping the on-time intervals of cycles.

7 Claims, 6 Drawing Sheets

(58) Field of Classification Search
USPC .................. 363/21.01, 21.03, 21.04, 21.05, 21.13, 363/21.12
See application file for complete search history.

(56) References Cited

U.S. PATENT DOCUMENTS

| | | | |
|---|---|---|---|
| 4,937,728 | A | 6/1990 | Leonardi |
| 5,745,352 | A | 4/1998 | Sandri et al. |
| 5,751,565 | A | 5/1998 | Faulk |
| 5,914,865 | A | 6/1999 | Barbehenn et al. |
| 6,456,511 | B1 | 9/2002 | Wong |
| 6,998,828 | B2 | 2/2006 | Casey et al. |
| 7,006,365 | B2 | 2/2006 | Kitano |
| 7,075,802 | B2 | 7/2006 | Yamashita |
| 7,079,404 | B2 | 7/2006 | Hong et al. |
| 7,084,799 | B1 | 8/2006 | Butler |
| 7,218,532 | B2 | 5/2007 | Choi et al. |
| 7,301,490 | B2 | 11/2007 | Butler |
| 7,471,530 | B2 | 12/2008 | Balakrishnan et al. |
| 7,733,673 | B2 | 6/2010 | Balakrishnan et al. |
| 7,782,638 | B2 | 8/2010 | Murata et al. |
| 7,894,222 | B2 | 2/2011 | Djenguerian et al. |
| 7,957,162 | B2 | 6/2011 | Choi et al. |
| 7,965,524 | B2 | 6/2011 | Balakrishnan et al. |
| 8,194,423 | B2 | 6/2012 | Balakrishnan et al. |
| 8,379,420 | B2 | 2/2013 | Orr |
| 2003/0151928 | A1 | 8/2003 | Kobori et al. |
| 2005/0078493 | A1 | 4/2005 | Kim et al. |
| 2006/0049811 | A1 | 3/2006 | Farkas |
| 2009/0284994 | A1 | 11/2009 | Lin et al. |
| 2010/0202175 | A1* | 8/2010 | Balakrishnan ........ H02M 3/335 363/126 |
| 2010/0321963 | A1 | 12/2010 | Yamashita |
| 2012/0224399 | A1 | 9/2012 | Balakrishnan et al. |
| 2013/0077350 | A1 | 3/2013 | Mao |
| 2013/0336020 | A1 | 12/2013 | Balakrishnan et al. |

FOREIGN PATENT DOCUMENTS

| | | |
|---|---|---|
| CN | 1679225 A | 10/2005 |
| CN | 101183829 A | 5/2008 |
| EP | 1179884 A2 | 2/2002 |
| EP | 1909382 A2 | 4/2008 |
| JP | 2003-299356 A | 10/2003 |
| JP | 2005-354801 A | 12/2005 |

OTHER PUBLICATIONS

Reiss, J.D., et al., "Efficient Compression of Oversampled 1-bit Audio Signals," Convention Paper Presented at the 111th Convention of the Audio Engineering Society, Sep. 21-24, 2001, New York, NY, pp. 1-4.

Esslinger, R., et al., "Digital Power Amplification Based on Pulse-Width Modulation and Sigma-Delta Loops. A Comparison of Current Solutions," Proceedings of the Institute of Radio Electronics, Czech and Slovak Radio Engineering Society (RADIOELEKTRONIKA '99), Brno, Czech Republic, Apr. 1999.

"VIPer53DIP; VIPer53SP—Off Line Primary Switch," ST Microelectronics, Jun. 2004, pp. 1-24.

"Application Note 28103.20—Switching Regulators Product Description: Series STR-A6100 Flyback Switching Regulators," Sanken Power Devices from Allegro MicroSystems, http://allegromicro.com/en/Products/Design/an/an28103020.pdf, Accessed Nov. 17, 2008, pp. 1-9.

"Application Note AN4102—A Fairchild Power Switch Based SMPS for Color Television Receivers," Rev. 1.0.2, Fairchild Semiconductor, Mar. 19, 2004, pp. 1-16.

"Application Note AN4105—Design Considerations for Switched Mode Power Supplies Using a Fairchild Power Switch (FPS) in a Flyback Converter," Rev. 1.0.2, Fairchild Semiconductor, Mar. 19, 2004, pp. 1-22.

"Application Note AN4108—A Fairchild Power Switch Based on Switched Mode Power Supply for CRT Monitor Use," Rev. 1.0.3, Fairchild Semiconductor, Mar. 19, 2004, pp. 1-16.

"Application Note AN4141—Troubleshooting and Design Tips for Fairchild Power Switch (FPS™) Flyback Applications," Rev. 1.0.0, Fairchild Semiconductor, Mar. 24, 2004, pp. 1-10.

"Application Note AN4146—Design Guidelines for Quasi-Resonant Converters Using FSCQ-series Fairchild Power Switch (FPS™)," Rev. 1.0.1, Fairchild Semiconductor, Sep. 20, 2005, pp. 1-24.

"Application Note AN4148—Audible Noise Reduction Techniques for FPS Applications," Rev. 1.0.0, Fairchild Semiconductor, Sep. 9, 2005, pp. 1-5.

Japanese Patent Application 260661/2007, Notice of Grounds of Rejection mailed Dec. 14, 2010. (10 pages).

CN 200710192931—First Chinese Office Action, issued Aug. 15, 2011, with English Translation (23 pages).

CN 200710192931—Second Chinese Office Action, issued Jun. 5, 2012, with English Translation (7 pages).

CN 200710192931.6—Third Chinese Office Action, issued Dec. 26, 2012, with English Translation (8 pages).

CN 200710192931.6—Fourth Chinese Office Action, issued Apr. 2, 2013, with English Translation, (10 pages).

U.S. Appl. No. 13/242,947—Non-Final Office Action, mailed Apr. 11, 2013 (17 pages).

EP 12 18 5147—European Search Report dated Mar. 7, 2014 (8 pages).

Choi, Jin-Ho et al., "The Improved Burst Mode in the stand-by operation of Power Supply," Applied Power Electronics Conference and Exposition, 2004, APEC '04, Nineteenth Annual IEEE, vol. 1, pp. 426-432.

EP 07253932.3—European Search Report dated Jun. 12, 2014 (8 pages).

CN 201210359988.1—First Chinese Office Action, issued Jun. 12, 2014, with English Translation (19 pages).

CN 201310425238.4—First Chinese Office Action and Search Report, issued May 5, 2015, with English Translation (8 pages).

CN 201210359988.1—Second Chinese Office Action, issued Jan. 15, 2015, with English Translation (9 pages).

JP Patent Application No. 2012-208291—Japanese Office Action and Search Report, with English Machine Translation, issued Sep. 27, 2016, 4 pages.

* cited by examiner

POWER SUPPLY CONTROLLER WITH MINIMUM-SUM MULTI-CYCLE MODULATION

REFERENCE TO PRIOR APPLICATION(S)

This is a continuation of U.S. application Ser. No. 13/242,947, filed Sep. 23, 2011, now pending. U.S. application Ser. No. 13/242,947 is hereby incorporated by reference.

BACKGROUND INFORMATION

Field of the Disclosure

This invention is related to power supplies. In particular, the invention is related to controllers for switching power supplies.

Background

In a typical application, an ac-dc power supply receives an input that is between 100 and 240 volts rms at a relatively low frequency that is nominally either 50 Hz or 60 Hz from an ordinary ac electrical outlet. The ac input voltage is usually rectified within the power supply to become a source of unregulated dc voltage for use by a dc-dc switching power converter. Switches in the power converter are typically switched on and off at a relatively high frequency (tens or hundreds of kilohertz) by a control circuit to provide a regulated output that may be suitable for operating an electronic device, or for charging a battery that provides power to an electronic device.

The design of a switching power supply is usually a compromise among conflicting requirements of efficiency, size, weight, and cost. The optimal solution that delivers the rated output power usually sets the switching frequency much higher than 20 kHz, outside the range of human hearing.

Regulatory requirements limit the amount of energy power supplies can consume when they operate at low loads, such as standby loads and at no load. When a switching power supply delivers much less than its rated power, the energy lost within the power supply is dominated by losses from the action of switching. Therefore, it is beneficial for the power supply to operate at lower switching frequencies when the output power is low to reduce the dominant losses.

The optimal switching frequency at low power often falls within the band of audio frequencies below 20 kHz. Switching within the band of audio frequencies can produce undesirable audio noise that results from mechanical excitation of electrical and magnetic components in the power supply. It is difficult to adjust the frequency of an oscillator in a continuous way to avoid the undesirable audio frequencies while meeting requirements for the power supply to be stable and to respond adequately to changes in load.

To overcome this difficulty, controllers for power supplies typically set an oscillator at a fixed frequency, and they regulate the output by allowing and preventing switching during the switching periods defined by the oscillator. The switching periods of the oscillator are sometimes referred to as switching cycles. The resulting groups of consecutive switching and non-switching periods produce an effective switching frequency that may be substantially less than the frequency of the oscillator. The effective switching frequency may be thought of as an average switching frequency that is substantially the fixed oscillator frequency multiplied by the ratio of the number of times switching occurs in a large number of consecutive switching periods divided by the large number of consecutive switching periods.

The switching periods where switching occurs are sometimes called enabled switching periods and the periods where switching is prevented are sometimes called disabled switching periods or skipped switching periods. It is important to distribute the enabled periods and the skipped periods in a way that avoids the generation of audio noise while allowing the power supply to switch often enough for it to respond adequately to changes in load. The requirement for galvanic isolation can place restrictions on the grouping of enabled periods and skipped periods.

Safety agencies generally require galvanic isolation between the input and the output of an ac to dc power supply. Galvanic isolation prevents dc current between the input and the output of the power supply. In other words, a high dc voltage applied between an input terminal and an output terminal of the power supply will produce no dc current between the input terminal and the output terminal of the power supply. The requirement for galvanic isolation is a complication that contributes to the cost of the power supply and to the difficulty of avoiding switching at undesirable audio frequencies.

A power supply with galvanic isolation must maintain an isolation barrier that electrically separates the input from the output such that circuits on the input side of the isolation barrier are galvanically isolated from the circuits on the output side of the isolation barrier. Energy must be transferred across the isolation barrier to provide power to the output, and information in the form of signals must be transferred across the isolation barrier to regulate the output. Galvanic isolation is typically achieved with electromagnetic and electro-optical devices. Electromagnetic devices such as transformers and coupled inductors are generally used to transfer energy between input and output to provide output power, whereas electro-optical devices are generally used to transfer signals between output and input to control the transfer of energy between input and output.

Efforts to reduce the cost of the power supply have focused on the elimination of electro-optical devices and their associated circuits. Alternative solutions generally use a single energy transfer element such as a transformer or coupled inductor to provide energy to the output and also to obtain the information necessary to control the output. The lowest cost configuration typically places the control circuit and a high voltage switch on the input side of the isolation barrier.

The controller obtains information about the output indirectly from observation of a voltage at either a winding of the energy transfer element or a winding of another switched electromagnetic element. The winding that provides the information is on the input side of the isolation barrier. To reduce cost and complexity further, the controller can also use the same winding of the energy transfer element to obtain information about the input to the power supply. A difficulty with the use of a switched magnetic element to obtain the information necessary to control the power supply is that the controller receives no information during periods where there is no switching. Therefore, the controller must force the switch to switch often enough for it to respond adequately to changes in the load.

The input side of the isolation barrier is sometimes referred to as the primary side, and the output side of the isolation barrier is sometimes referred to as the secondary side. Windings of the energy transfer element that are not galvanically isolated from the primary side are also primary side windings, sometimes called primary referenced windings. A winding on the primary side that is coupled to an input voltage and receives energy from the input voltage is sometimes referred to simply as the primary winding. Other primary referenced windings that deliver energy to circuits on the primary side may have names that describe their principal function, such as for example a bias winding, or for example a sense winding. Windings that are galvanically isolated from the primary side windings are secondary side windings, sometimes called output windings.

Power supply controllers that obtain information about an output on the secondary side from a winding on the primary side, especially when the information is in the form of a pulsating signal, are sometimes referred to as having primary side controllers, and the power supplies are said to operate with primary side control.

Existing controllers for power supplies that reduce the effective switching frequency by either allowing or preventing switching during groups of switching periods have difficulty meeting cost and performance requirements in galvanically isolated applications. A low-cost solution is needed for primary side controllers to avoid effective switching frequencies that fall within the range of undesirable audio frequencies while allowing adequate control of the output.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for controlling a power supply with minimum-sum multi-cycle modulation are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
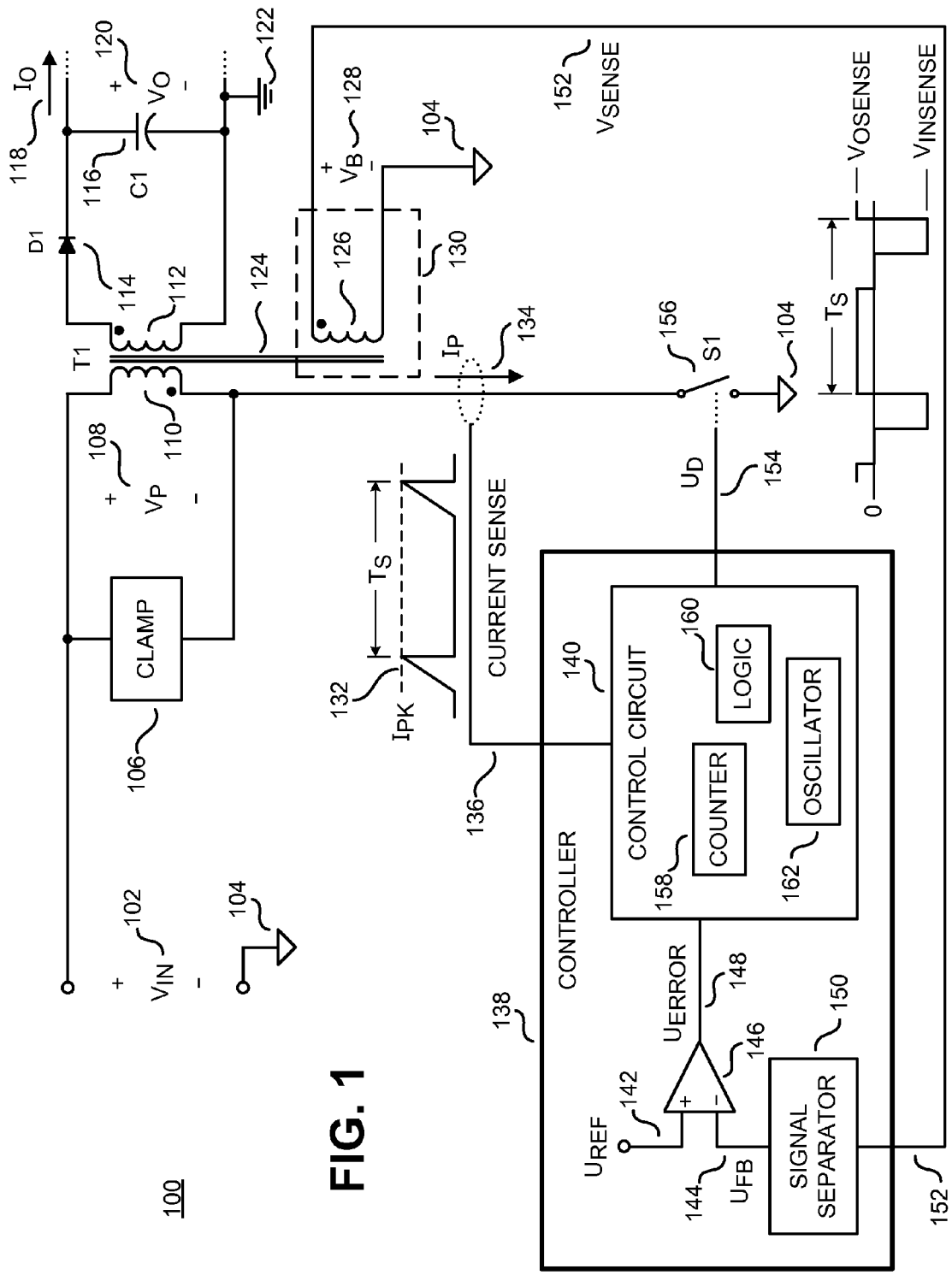
FIG. 1 is a functional block diagram that shows an example of a power supply with a primary side controller in accordance with the teachings of the present invention.

To illustrate, the schematic diagram of FIG. 1 shows salient features of one example of a dc-dc power supply 100 with galvanic isolation that receives an input voltage $V_{IN}$ 102 to produce an output voltage $V_O$ 120 and an output current $I_O$ 118 to a load (not shown in FIG. 1) in accordance with the teachings of the present invention. In an example of an ac-dc power supply, the dc input voltage $V_{IN}$ 102 may be a rectified and filtered ac input voltage. Input voltage $V_{IN}$ 102 is positive with respect to an input return 104. Output voltage $V_O$ 120 is positive with respect to an output return 122. In other examples, the power supply may have more than one output.

The dc-dc power supply 100 in the example of FIG. 1 includes an energy transfer element T1 124 and a switch S1 156. The switch S1 156 represents the operation of a controlled semiconductor device such as for example a metal oxide semiconductor field effect transistor (MOSFET) or for example a bipolar junction transistor (BJT). The dc-dc power supply 100 in the example of FIG. 1 also includes a controller 138 that receives a current sense signal 136 and a voltage sense signal 152. In the example of FIG. 1, a voltage sense circuit 130 produces a pulsating voltage $V_B$ 128 that may be positive and negative with respect to the input return 104.

In the example illustrated in FIG. 1, energy transfer element T1 124 is a coupled inductor, sometimes referred to as a transformer, with three windings. Winding 110 is a primary winding that has one end coupled to the input voltage $V_{IN}$ 102 and the opposite end coupled to the switch S1 156. Winding 112 is a secondary winding that has one end coupled to the output return 122 and the opposite end coupled to an output rectifier D1 114. Winding 126 is a sense winding, sometimes referred to as a bias winding, with one end coupled to the input return 104. The polarities of the windings, indicated by the dots at one end of each winding (dotted ends have the same polarity), show that the example of FIG. 1 is configured to be a flyback power supply.

In the operation of the flyback power supply example of FIG. 1, controller 138 produces a drive signal $U_D$ 154 that may open and close switch S1 156 within repetitive switching periods of duration $T_S$. When switch S1 156 is closed (also referred to as being ON or being in an ON state), the switch S1 156 may conduct current $I_P$ 134 in the primary winding 110 of energy transfer element 124. When switch S1 156 is open (also referred to as being OFF or being in an OFF state), the switch S1 156 cannot conduct current.

When switch S1 156 is ON, the voltage $V_P$ 108 across the primary winding 110 of the energy transfer element 124 is the input voltage $V_{IN}$ 102. While switch S1 is ON in the example of FIG. 1, primary current $I_P$ 134 increases until it reaches a value of a variable current limit $I_{PK}$ 132. In the example of FIG. 1, there is substantially no current in secondary winding 112 and substantially no current in sense winding 126 while switch S1 156 is ON.

Controller 138 senses a pulsating primary current $I_P$ 134 that is also the current in the switch S1 156 as a current sense signal 136. Any of the many known ways to sense current, such as for example receiving the voltage across a resistor conducting the current, or for example receiving a scaled current from a current transformer, or for example receiving the voltage across the on-resistance of a metal oxide semiconductor field-effect transistor (MOSFET) that conducts the current, may be used to sense the primary current $I_P$ 134 and to provide current signal 136 to controller 138.

The waveforms of current and voltage illustrated in the example of FIG. 1 show that the power supply 100 is operating in the discontinuous conduction mode (DCM), which is typical for operation at light loads. A distinguishing characteristic of operation in DCM is that the primary current $I_P$ 134 is zero immediately after the switch S1 156 turns ON. At higher loads, the power supply typically operates in the continuous conduction mode (CCM), which is distinguished by a jump in primary current $I_P$ 134 from zero to a finite positive value immediately after the switch S1 156 turns ON, not shown in FIG. 1.

When primary current $I_P$ 134 reaches the value of a variable current limit $I_{PK}$ 132, controller 138 opens switch S1 156 and current $I_P$ 134 falls to zero. A clamp circuit 106 is typically coupled across primary winding 110 to limit the voltage on switch S1 156 when switch S1 156 opens.

When controller 138 opens the switch S1 156, energy stored in coupled inductor T1 124 while the switch S1 156 was conducting produces a current in secondary winding 112. The pulsating current in secondary winding 112 is rectified by diode D1 114 and filtered by capacitor C1 116 to produce a substantially dc output voltage $V_O$ 120.

The switching of switch S1 156 produces a voltage $V_B$ 128 on bias winding 126 that is related by transformer action to the voltages on primary winding 110 and secondary winding 112. When switch S1 156 is ON, the voltage $V_B$ 128 is negative with respect to the output return 104 with a magnitude that is substantially the input voltage $V_{IN}$ 102 scaled by the turns ratio that is the number of turns on winding 126 divided by the number of turns on winding 110. When switch S1 156 turns OFF and diode D1 114 is conducting, the voltage $V_B$ 128 is positive with respect to the output return 104 with a value that is substantially the output voltage $V_O$ 120 plus the voltage across diode D1 114 when the diode is conducting, the sum scaled by the turns ratio, which is the number of turns on winding 126 divided by the number of turns on winding 112.

Controller 138 in the example of FIG. 1 includes a signal separator 150 to extract the sensed input voltage $V_{INSENSE}$ and the sensed output voltage $V_{OSENSE}$ from voltage sense signal $V_{SENSE}$ 152. In one example, signal separator 150 may be a rectifier followed by a sample and hold circuit that provides a substantially dc feedback signal $U_{FB}$ 144 that is representative of the output voltage $V_O$ 120.

Controller 138 in the example of FIG. 1 also includes an error amplifier 146 that produces an error signal $U_{ERROR}$ 148 from the difference between the feedback signal $U_{FB}$ 144 and a reference signal $U_{REF}$ 142. The reference signal $U_{REF}$ 142 is representative of the desired value of the output $V_O$ 120, whereas the feedback signal $U_{FB}$ 144 is representative of the actual value of the output voltage $V_O$ 120. In one example, error amplifier 146 includes an integrator that integrates the difference between the reference signal $U_{REF}$ 142 and the feedback signal $U_{FB}$ 144. In other examples, error amplifier 146 may include a differentiator as well as an integrator to provide desired characteristics for the stability and the behavior of the power supply in response changes in input voltage $V_{IN}$ 102 and output current $I_O$ 118 as is well known in the art.

Controller 138 in the example of FIG. 1 also includes a control circuit 140 that receives the error signal $U_{ERROR}$ 148 and produces the drive signal $U_D$ 154 that switches the switch S1 156. Control circuit 140 in the example of FIG. 1 may include various analog and digital circuits such as for example counters 158, logic gates 160, and oscillators 158, to provide the desired relationships among the error signal $U_{ERROR}$ 148, the current sense signal 136, and the drive signal $U_D$ 154.

The control circuit 140 may filter the current sense signal 136 and the error signal 148 $U_{ERROR}$ in various ways to provide the desired behavior of the power supply under a variety of conditions such as for example, startup, shutdown, overload, light load, and no-load.

In one example, control circuit 140 adjusts the value of the variable current limit $I_{PK}$ 132 in response to the error signal $U_{ERROR}$ 148 so that the output voltage $V_O$ 120 is regulated at a desired value. When the switching period $T_S$ is fixed, adjustment of the variable current limit $I_{PK}$ 132 changes the duration that the switch S1 156 is ON, sometimes referred to as the on-time. The duration that the switch S1 156 is ON is also sometimes referred to as the on-time interval of the cycle. This type of control may be described as peak current pulse width modulation (PWM) with fixed frequency. It is sometimes referred to as fixed frequency peak current mode control or just current mode control.

In other examples, the control circuit 140 may directly adjust the time that the switch S1 156 is ON within a fixed switching period when the primary current 134 is less than a fixed current limit. This type of control sometimes referred to as fixed frequency voltage mode PWM, or fixed frequency duty ratio control.

In yet other examples, the control circuit 140 may fix the on-time of the switch when the primary current 134 is less than a fixed current limit and it may adjust a variable switching period to regulate the output. Alternatively, the control circuit 140 may set a fixed current limit to turn the switch OFF, and it may adjust a variable switching period to regulate the output. The control circuit may vary the length of time the switch is ON and OFF in many different ways to regulate the output of the power supply at moderate to heavy loads.

At light loads the controller 138 may use a circuit to control the power supply such that switching events are gathered into groups of consecutive periods where switching occurs, separated by groups of consecutive periods where switching does not occur, and the sum of the number of periods in a group where switching occurs plus the number of periods in a group where switching does not occur is always greater than or equal to a minimum value. This type of control may be described as minimum-sum multi-cycle modulation. In one example, the sum of the number of enabled periods plus the number of skipped periods is a constant. Minimum-sum multi-cycle modulation restricts the grouping of enabled periods and skipped periods to avoid effective switching frequencies that fall within the range of undesirable audio frequencies while allowing adequate control of the output.

Figure 2:
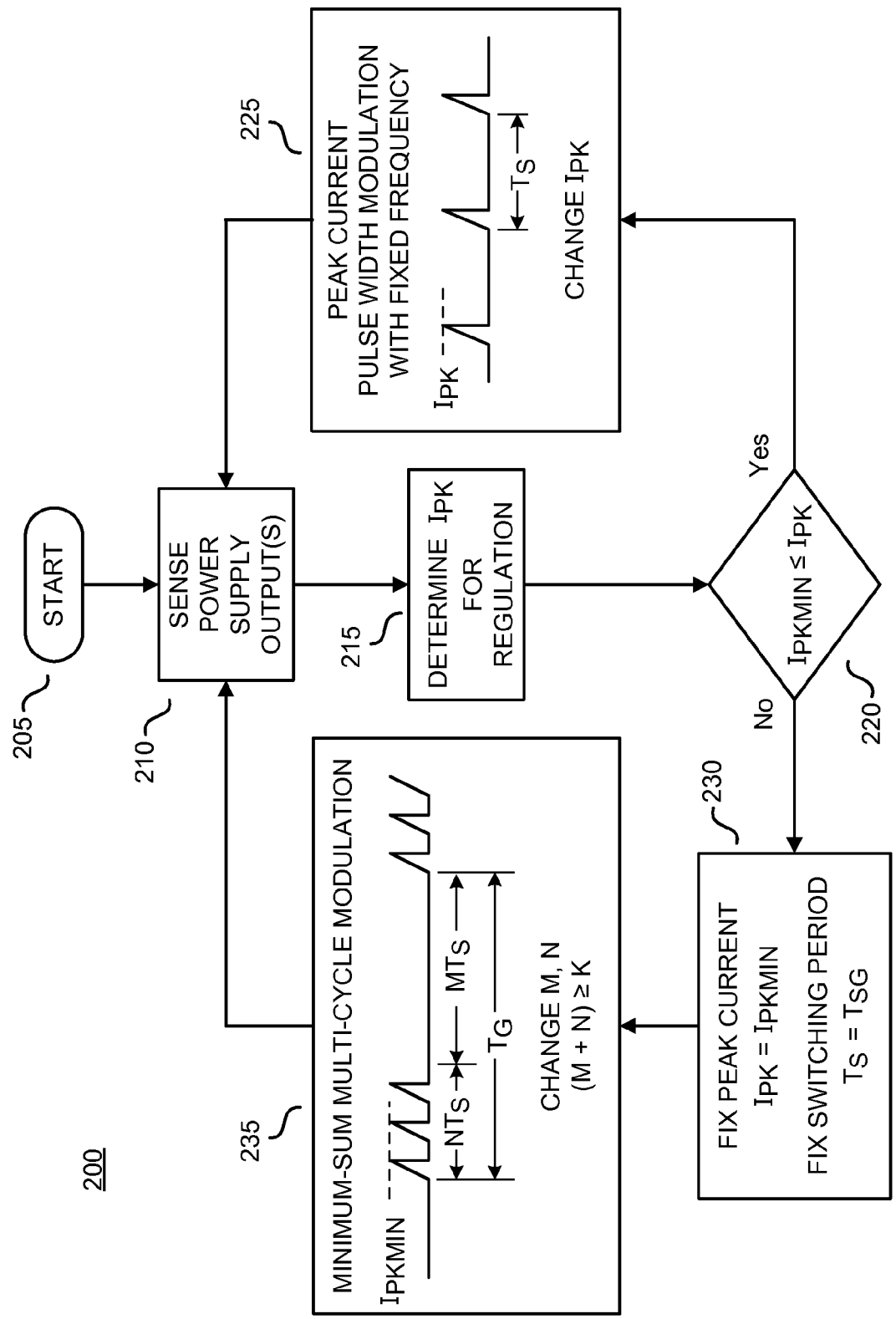
FIG. 2 is an example flow diagram illustrating generally a sample flow of operations of an example switching power supply providing power to a load in accordance with the teachings of the present invention.

FIG. 2 is an example flow diagram that describes generally a method to control a power supply according to the teachings of the present invention. Starting in block 205, sensing of power supply output(s) occurs at block 210. In a power supply with primary side control, the outputs are sensed from a winding on the input side of the power supply.

Next, in block 215, the controller uses information sensed about the power supply output(s) to determine the peak current $I_{PK}$ 132 required to regulate the output with a fixed switching period $T_S$. Next, the value of peak current $I_{PK}$ 132 is compared to a minimum peak current $I_{PKMIN}$ at a decision block 220. In one example, the minimum peak current $I_{PKMIN}$ corresponds to a minimum time that output rectifier D1 114 must conduct for reliable sensing of the output voltage $V_O$ 120. In one example, the minimum peak current $I_{PKMIN}$ is 25% of the maximum peak current allowed by the design of the power supply.

In one example, the peak current $I_{PK}$ 132 is determined from the magnitude of an error signal such for example $U_{ERROR}$ 148 in FIG. 1. A small error signal typically implies a light load that demands a reduced effective switching frequency to meet the requirements of high efficiency. Under those conditions, decision block 220 finds that $I_{PK} < I_{PKMIN}$, and the flow is directed to block 230. Peak current $I_{PK}$ 132 is fixed at the value $I_{PK}$ and the period of the switching cycle $T_S$ is fixed at the value $T_{SG}$ in block 230. Regulation is then accomplished with minimum-sum multi-cycle modulation in a block 235.

As shown in block 235, minimum-sum multi-cycle modulation accomplishes regulation of the output by enabling N periods of switching in the switch signal, each having period $T_{SG}$, followed by no switching for M periods of $T_{SG}$. In the example, the sum of N and M is restricted to be greater than or equal to a minimum value K, where the value of K is chosen to meet the performance requirements of the intended application. Minimum-sum multi-cycle modulation places a minimum value on the group period $T_G$. In the example, minimum-sum multi-cycle modulation in accordance with the teachings of the present invention avoids the generation of undesirable audio frequencies while allowing the power supply to meet requirements of cost, efficiency, and output regulation.

In one example, $I_{PKMIN}$ is set at approximately 25% of the peak current at maximum output power of the power supply. In one embodiment, the fixed switching frequency is 30 kHz and the value of K is 6 to establish a maximum effective switching frequency of 5 kHz. The maximum effective switching frequency, although in the range of human hearing, may be outside the range of audio frequencies that excite mechanical resonances in the components of the power supply.

If the decision block 220 finds that $I_{PKMIN} \leq I_{PK}$, then the flow is directed to a block 225 so that regulation is accomplished with peak current PWM at fixed switching frequency instead of minimum-sum multi-cycle modulation. In one example, minimum-sum multi-cycle modulation may be used to regulate the delivery of low output power, and fixed frequency peak current PWM (also known as fixed frequency peak current mode control) may be used to regulate the delivery of higher output power in accordance with the teachings of the present invention.

Thus, in one example, dependent upon the relationship between peak switch current $I_{PK}$ and minimum peak switch current $I_{PKMIN}$, the switch may be controlled to conduct according to a first or a second operating mode. In the first operating mode, a switch is controlled to conduct during a fixed time within the switching period and the peak switch current within the fixed switching period is adjusted to regulate the output of a power supply. Alternatively, in a second operating mode, the switch may be controlled to conduct within a fixed switching period, one group of consecutive switching periods separated from a next group of consecutive switching periods by a time of no switching, the time of no switching is adjusted to regulate the output of the power supply. In the example, the time of no switching may be adjusted so that the effective switching frequency either falls outside an audible frequency range or falls below a frequency within an audible frequency range, the adjustment restricted such that the sum of the number of periods in a group where switching occurs plus the number of periods in the next group where switching does not occur is greater than or equal to a minimum value.

In one example, period modulation, also known as frequency modulation, could be used instead of peak current mode PWM to regulate delivery of higher power in accordance with the teachings of the present invention. In that example, the decision to use period modulation versus minimum-sum multi-cycle modulation would consider the equivalent switching frequency rather than the peak current that is needed to keep the output in regulation. For example, when the switching period increases in response to the feedback signal and crosses a threshold that would indicate a light load, the operation is changed from period modulation to minimum-sum multi-cycle modulation.

In another example, fixed frequency voltage mode PWM could be used instead of peak current mode PWM to regulate delivery of higher power in accordance with the teachings of the present invention. In that example, the decision to use PWM versus minimum-sum multi-cycle modulation would consider the on-time of the switch rather than peak current that is needed to keep the output in regulation. For example, when the on-time decreases in response to the feedback signal and crosses a threshold that would indicate a light load, the operation is changed from fixed frequency voltage mode PWM to minimum-sum multi-cycle modulation.

Figure 3:
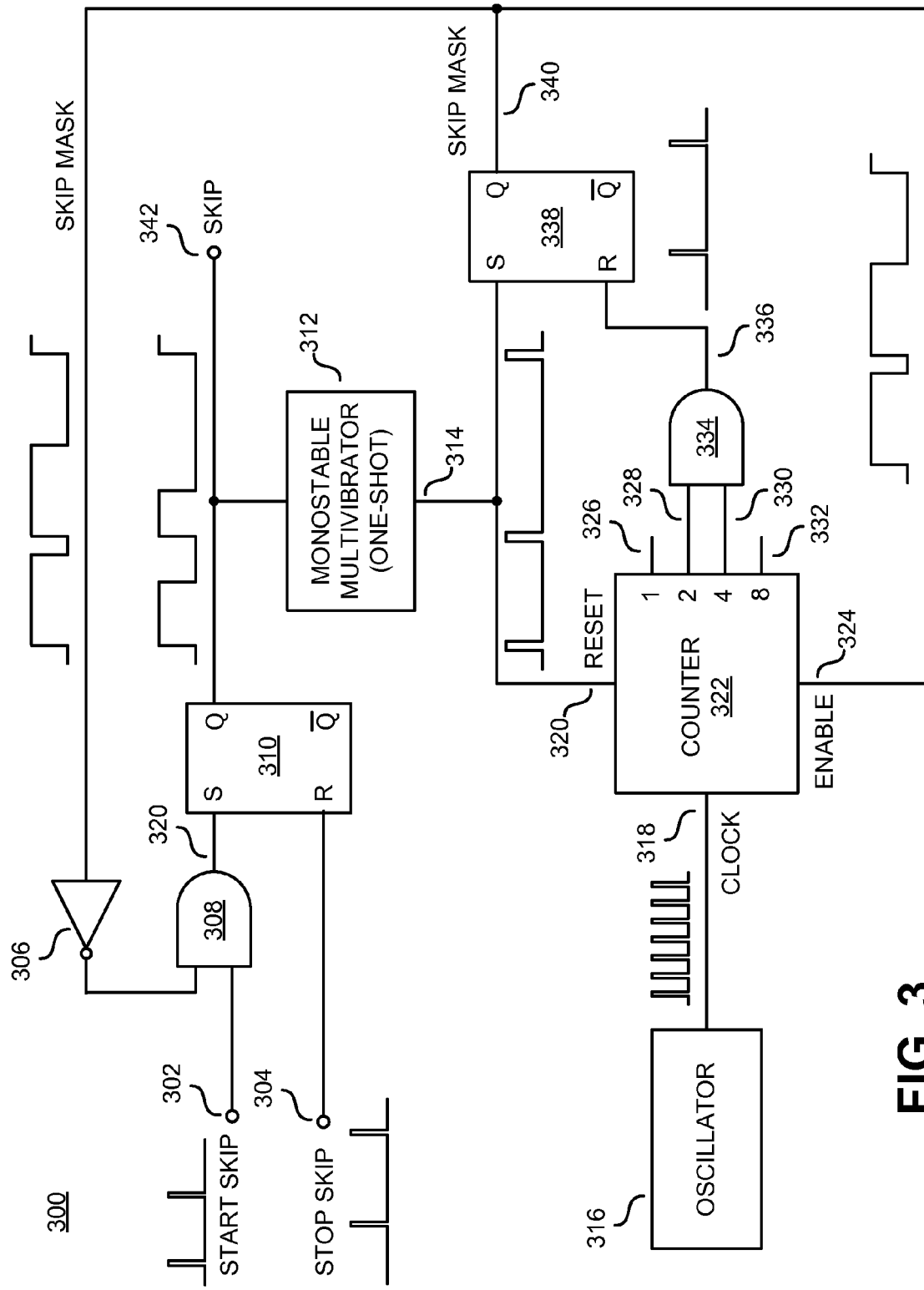
FIG. 3 is schematic diagram showing a portion of an example controller for a power supply that illustrates an example circuit for minimum-sum multi-cycle modulation in accordance with the teachings of the present invention.
Figure 4:
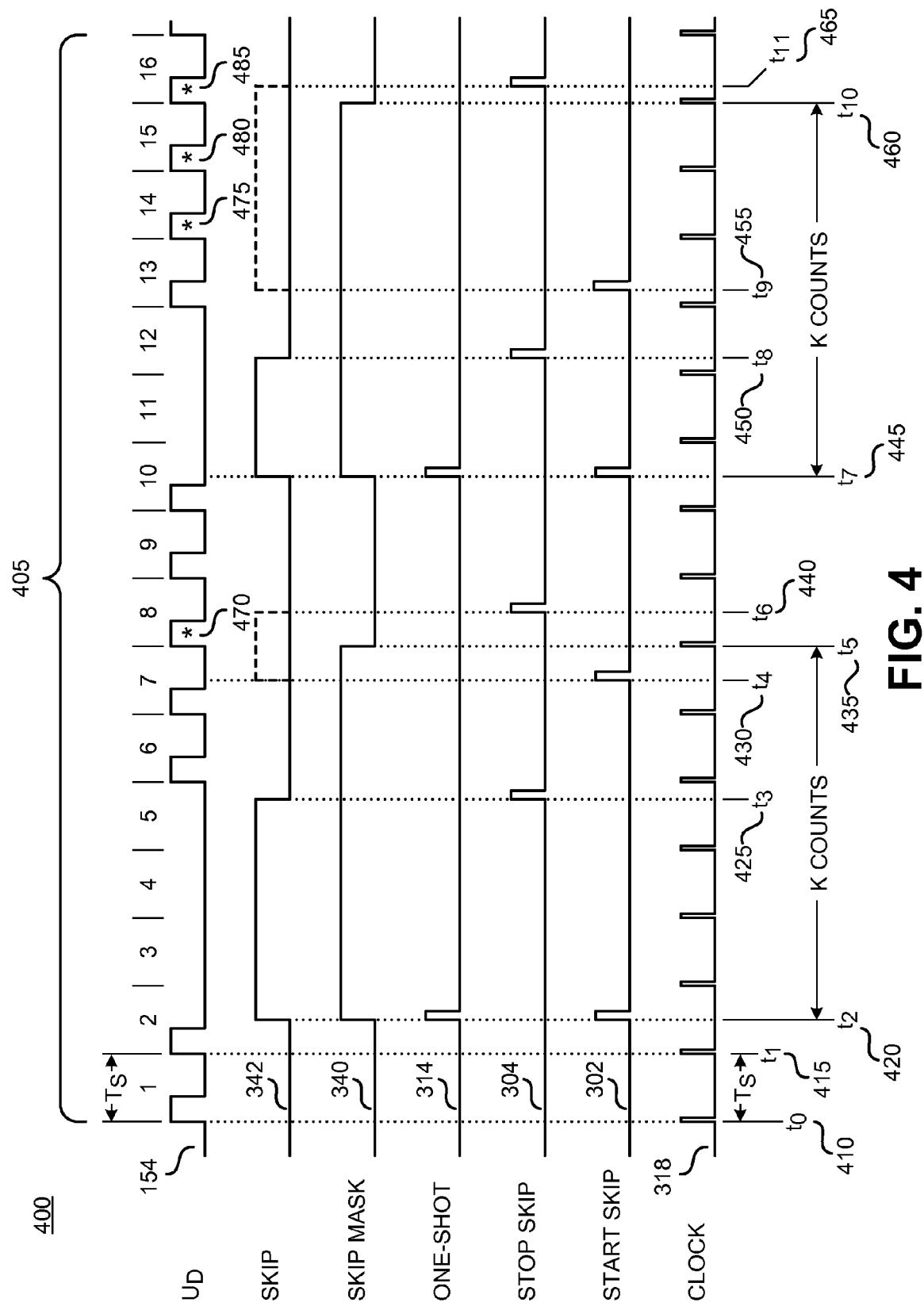
FIG. 4 is a timing diagram that shows signals in the example minimum-sum multi-cycle modulation circuit example shown in FIG. 3.

FIG. 3 is a schematic diagram 300 that shows one example of a circuit for minimum-sum multi-cycle modulation in accordance with the teachings of the present invention. The schematic diagram 300 of FIG. 3 is a portion of a control circuit 140 included in an example controller 138 for an example power supply, such as for example power supply 100 of FIG. 1. As shown, the minimum-sum multi-cycle modulation circuit example of FIG. 3 includes inverter 306, AND gates 308 and 334, latches 310 and 338, monostable multivibrator 312, oscillator 316 and counter 322. FIG. 4 is a timing diagram 400 that shows the relationships among signals in the schematic diagram of FIG. 3.

In the depicted example, oscillator 316 in FIG. 3 provides a clock signal 318 that establishes the switching frequency and marks the switching periods for the power supply. In one example, clock signal 318 is also distributed throughout various circuits in the controller not shown in FIG. 3. FIG. 4 shows clock signal 318 marking the start of 16 consecutive switching periods 405, each with duration $T_S$. In the example of FIG. 4, the drive signal $U_D$ 154 is synchronized with the clock signal 318. The rising edge of the drive signal $U_D$ 154 in the first switching period in the sequence of switching periods 405 is coincident with the rising edge of the clock signal 318 at time $t_0$ 410.

When the power supply operates with minimum-sum multi-cycle modulation, the circuit in FIG. 3 receives a START SKIP signal 302 and a STOP SKIP signal 304 to produce a SKIP signal 342. In the minimum-sum multi-cycle modulation circuit of FIG. 3, the START SKIP signal 302 and the STOP SKIP signal 304 may be considered inputs, and the SKIP signal 342 may be considered the output. In one example, the SKIP signal 342 inhibits the drive signal $U_D$ 154 so that switching cannot occur when the SKIP signal 342 is at a high logic level. In one example, a simple logic circuit such as an AND gate (not shown) receiving the complement of SKIP signal 342 at one input and receiving a drive command at another input may be inhibit the drive signal $U_D$ 154 when SKIP signal 342 is high.

In one example, a logic circuit (not shown) generates the START SKIP signal 302 and the STOP SKIP signal 304 in response to the error signal $U_{ERROR}$ 148. When the error signal $U_{ERROR}$ 148 falls below a skip threshold, a logic circuit produces a pulse that is the START SKIP signal 302. When the error signal $U_{ERROR}$ 148 rises above the skip threshold, a logic circuit produces a pulse that is the STOP SKIP signal 304.

In the absence of the minimum-sum multi-cycle modulation circuit explained below, the START SKIP signal 302 would begin a sequence of switching periods where switching is prevented, and the STOP SKIP signal 304 would begin a sequence of switching periods where switching is allowed. In the example of FIG. 3, the minimum-sum multi-cycle modulation circuit monitors the SKIP signal 342 and masks the START SKIP signal 302 when necessary to restrict the number of skipped periods such that the sum of the number of switching periods N in a group where switching is allowed plus the number of switching periods M in the following group where switching is prevented is greater than or equal to a minimum number K.

In the timing diagram of FIG. 4, switching events 470, 475, 480, and 485 of the drive signal $U_D$ 154 are marked by an asterisk to indicate that those events would have been skipped if the minimum-sum multi-cycle circuit had not masked the START SKIP signal 302 from latch 310. At time $t_0$ 410, START SKIP signal 302, STOP SKIP signal 304, ONE-SHOT signal 314, SKIP MASK signal 340, and SKIP signal 342 are at a logic low level. Since SKIP signal 342 is low at time $t_0$ 410, the pulse from CLOCK signal 318 at time $t_0$ 410 begins an enabled switching period where the drive signal $U_D$ 154 goes high. Drive signal $U_D$ 154 stays high until current sense signal 136 in FIG. 1 reaches the current limit value $I_{PK}$ 132 also shown in FIG. 1. The next switching period that begins at time $t_1$ 415 is also an enabled switching period in which drive signal $U_D$ 154 goes high again.

SKIP signal 342 and SKIP MASK signal 340 remain low until the START SKIP signal 302 goes high at time $t_2$ 420. When START SKIP signal 302 goes high at time $t_2$ 420, latch 310 sets SKIP signal 342 to a high logic level. A high level on SKIP signal 342 disables switching (prevents the switch S1 156 from turning on). Therefore, drive signal $U_D$ 154 stays low while SKIP signal 342 is high. SKIP signal 342 remains high until STOP SKIP signal 304 goes high at time $t_3$ 425.

When SKIP signal 342 goes to a high logic level at time $t_2$ 420, monostable multivibrator 312, also called a one-shot, produces an output signal 314 that sets SKIP MASK signal 340 that is an output of latch 338 to a high logic level. Output signal 314 from one-shot 312 is received at a RESET input 320 of counter 322 to set outputs 326, 328, 330, and 332 to zero (low logic levels). Outputs 326, 328, 330, and 332 of counter 322 represent respectively the least significant to the most significant binary digits of the value of the count of counter 322. SKIP MASK signal 340 is also received at an ENABLE input 324 of counter 322. When SKIP MASK signal 340 goes high, counter 322 begins to count pulses of the CLOCK signal 318. In other examples, ENABLE input 324 of counter 322 may be fixed at a high logic level instead of receiving SKIP MASK signal 340 so that counter 322 counts continuously. A counter enabled by SKIP MASK signal 340 has reduced switching loss, whereas a counter operating continuously may provide a continuous clock signal at a reduced frequency for use by other circuits not shown in FIG. 3.

SKIP MASK signal 340 stays high until one or more outputs of counter 322 reaches a value that causes the output of AND gate 334 to reset latch 338. In the example of FIG. 3, the value of the output of counter 322 that resets latch 338 is 6, or a binary value of 0110, because the two inputs of AND gate 334 receive outputs 328 and 330 from counter 322. Outputs 328 and 330 from counter 322 are both high when the counter reaches a value of 6.

In another example, other outputs from counter 322 may be received by an AND gate with two more inputs to reset latch 338 at a different value from counter 322. In yet another example, a more elaborate logic circuit may receive outputs from counter 322 and be logically combined with either control signals or programming signals so that the count that resets latch 322 may be changed dynamically according to the needs of the power supply.

In the example timing diagram of FIG. 4, START SKIP signal 302 goes high at time $t_4$ 430, but SKIP signal 342 does not go high at time $t_4$ 430 because it is masked by SKIP MASK signal 340. A high logic level on SKIP MASK signal 340 is inverted by inverter 306 to apply a low logic level at an input of AND gate 308, thereby preventing START SKIP signal 302 from setting latch 310. In the absence of the minimum-sum multi-cycle modulation circuit of FIG. 3, SKIP signal 342 in FIG. 4 would go high at time $t_4$ 430 and would go low at time $t_6$ 440 in response to START SKIP signal 302 and STOP SKIP signal 304 respectively, as indicated by the dashed lines on SKIP signal 342 in FIG. 4 between times $t_4$ 430 and $t_6$ 440.

In the example of FIG. 4, SKIP MASK signal 340 goes high at time $t_2$ 420 and stays high for K counts of CLOCK signal 318, going low at time $t_5$ 435. Since FIG. 4 shows the operation of the example circuit of FIG. 3, K=6 and the SKIP MASK signal 340 goes low on the sixth pulse of CLOCK signal 318 after SKIP MASK signal 340 enables counter 322 at time $t_2$ 420.

FIG. 4 shows that the START SKIP signal 302 goes high at time $t_4$ 430, but SKIP signal 342 does not go high at time $t_4$ 430 because SKIP MASK signal 340 is high at time $t_4$ 430, causing AND gate 308 to prevent START SKIP signal 302 from setting latch 310.

The example of FIG. 4 shows that START SKIP signal 302 goes high again at time $t_7$ 445 when SKIP MASK signal 340 is low. Therefore, START SKIP signal 302 sets latch 310 to raise SKIP signal 342 to a high logic level. The transition of SKIP signal 342 produces a pulse of ONE-SHOT signal 314 from monostable multivibrator 312 that sets latch 338 and resets counter 322.

The example of FIG. 4 shows that SKIP signal 342 goes low at time $t_8$ 450 in response to STOP SKIP signal 304, but SKIP signal 342 does not go high at time $t_9$ 455 in response to START SKIP signal 302 because SKIP MASK signal 340 is still high at time $t_9$ 455. SKIP MASK signal 340 remains high until time $t_{10}$ 460, when counter 322 reaches the sixth count of CLOCK signal 318 after counter 322 was reset and enabled at time $t_7$ 445. Counter 322 and AND gate 334 may be considered a filter circuit that resets SKIP MASK signal 340 in response to SKIP signal 342 and CLOCK signal 318.

In the example of FIG. 4, SKIP MASK signal 340 allows switching events 475, 498, and 485 to occur after START SKIP signal 302 goes high at time $t_9$ 455. STOP SKIP signal 304 goes high at time $t_{110}$ 465, but it has no effect because SKIP signal 342 did not go high when START SKIP signal 302 went high at time $t_9$ 455. In the absence of the minimum-sum multi-cycle modulation circuit, SKIP signal 342 would go high at time $t_9$ 455 as indicated by the broken lines on SKIP signal 342 between times $t_9$ 455 and $t_{11}$ 465.

As illustrated by the examples of FIG. 3 and FIG. 4, minimum-sum multi-cycle modulation puts a lower bound on the number of enabled and disabled switching periods. Minimum-sum multi-cycle modulation does not impose an upper bound on either the number of enabled switching periods or the number of disabled switching periods. Therefore, under conditions of no load, switching could be disabled indefinitely by an unlimited number of skipped periods. To avoid problems with extended times of no switching, controllers for power supplies that use primary side control typically have a timer that puts an upper bound on the time between switching events. In one example, a timer (not shown in controller 138) forces switch S1 156 to close at least every 4 milliseconds.

Figure 5:
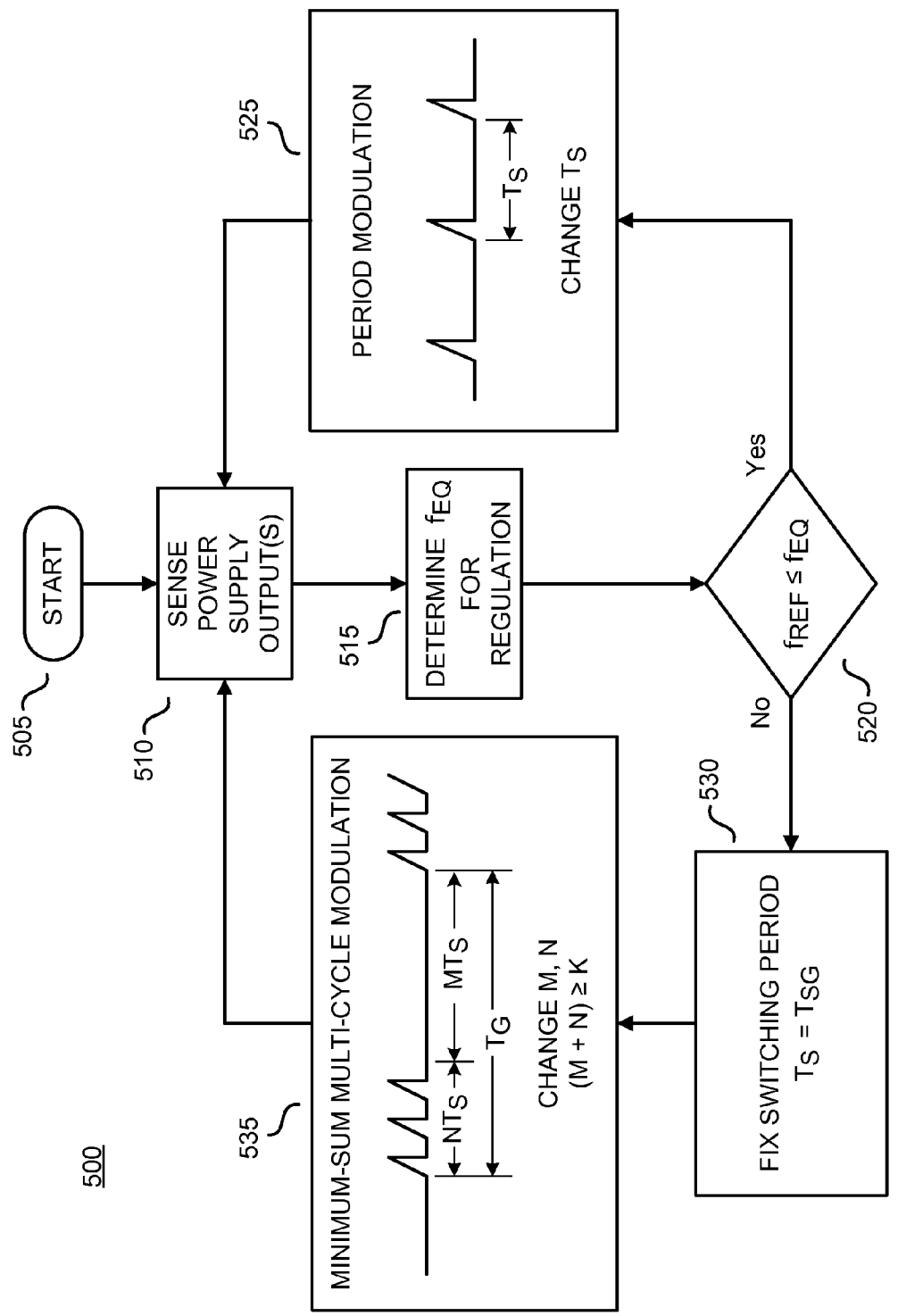
FIG. 5 is another example flow diagram illustrating generally a sample flow of operations of another example switching power supply providing power to a load in accordance with the teachings of the present invention.

FIG. 5 is another example flow diagram that describes generally another method to control a power supply according to the teachings of the present invention. Starting in block 505, sensing of power supply output(s) occurs at block 510.

Next, in block 515, the controller uses information sensed about the power supply output(s) to determine an equivalent switching frequency $f_{EQ}$ required to regulate the power supply output with period modulation that varies the switching period $T_S$. Next, the value of the equivalent switching frequency $f_{EQ}$ is compared to a reference value $f_{REF}$ at a decision block 520. In one example, the reference frequency $f_{REF}$ is greater than or equal to the highest audio frequency of interest. In one embodiment, the reference frequency is approximately 30 kHz.

In one example, switching frequency $f_{EQ}$ is estimated to be higher or lower than reference frequency $f_{EQ}$ on the basis of a feedback signal. An estimate of $f_{EQ}$ lower than $f_{REF}$ implies a light load that demands a switching frequency within the range of audio frequencies. Under these conditions, decision block 520 finds that $f_{REF} > f_{EQ}$ and the flow is directed to block 530. Regulation is then accomplished with minimum-sum multi-cycle regulation in block 535.

As shown in block 535, minimum-sum multi-cycle modulation accomplishes regulation of the output by enabling N periods of switching in the switch signal, each having period $T_{SG}$, followed by no switching for M periods of $T_{SG}$. In the example, the sum of N and M is restricted to be greater than or equal to a minimum value K, where the value of K is chosen to meet the performance requirements of the intended application. In the example, minimum-sum multi-cycle modulation in accordance with the teachings of the present invention avoids the generation of undesirable audio frequencies while allowing the power supply to meet requirements of cost, efficiency, and output regulation.

If the decision block 520 finds that $f_{REF} \leq f_{EQ}$, then the flow is directed to a block 525 so that regulation is accomplished with period modulation instead of minimum-sum multi-cycle modulation. In one example, minimum-sum multi-cycle modulation may be used to regulate the delivery of low output power, and period modulation (also known as frequency modulation) may be used to regulate the delivery of higher output power in accordance with the teachings of the present invention.

Figure 6:
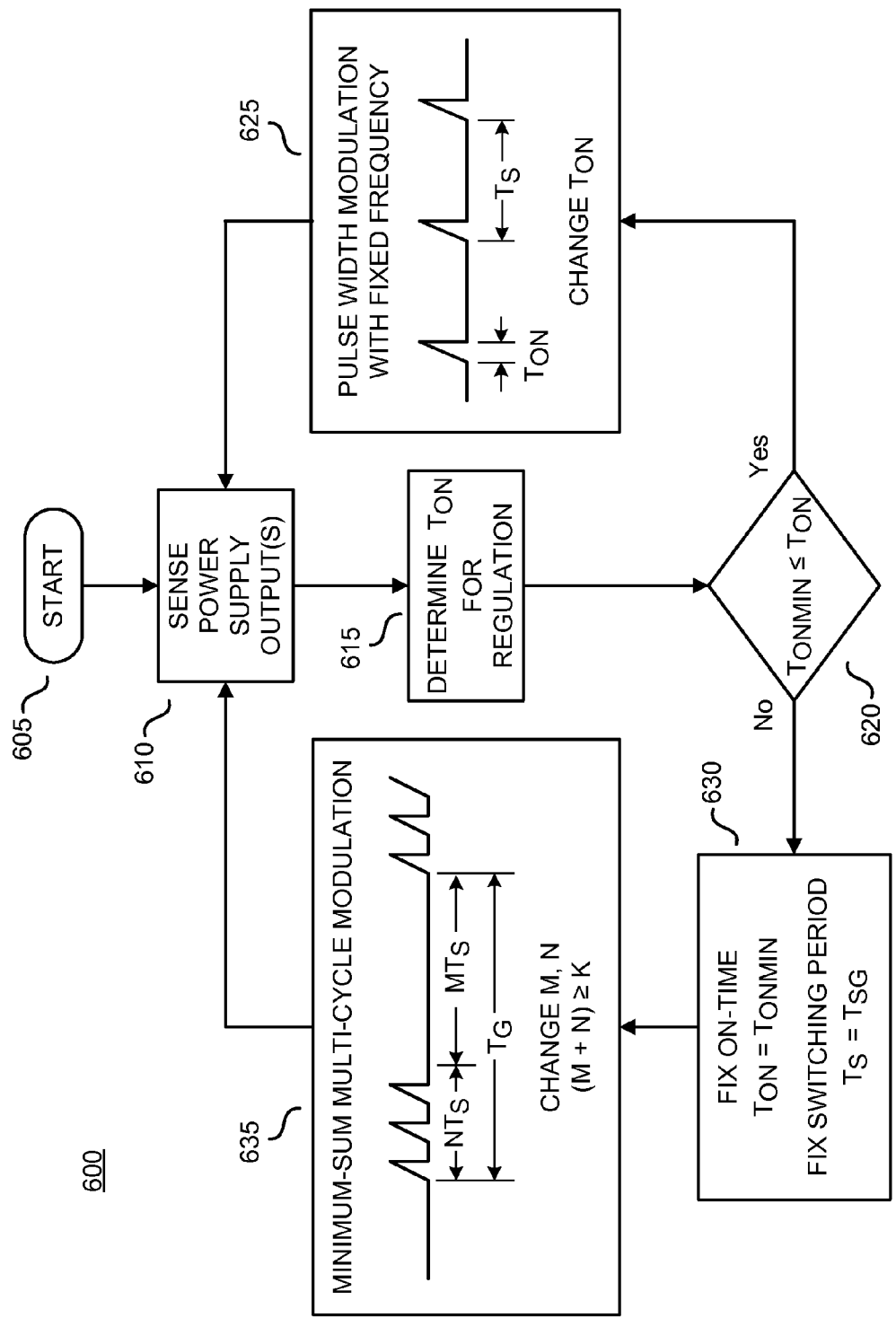
FIG. 6 is yet another example flow diagram illustrating generally a sample flow of operations of another example switching power supply providing power to a load in accordance with the teachings of the present invention.

FIG. 6 is yet another example flow diagram that describes generally yet another method to control a power supply according to the teachings of the present invention. Starting in block 605, sensing of power supply output(s) occurs at block 610.

Next, in block 615, the controller uses information sensed about the power supply output(s) to determine an on-time $T_{ON}$ of a switch within a fixed switching period $T_S$ required to regulate the power supply output with pulse width modulation at a fixed switching frequency. Next, the value of the on-time $T_{ON}$ is compared to a reference minimum value $T_{ONMIN}$ at a decision block 620. In one example, the minimum on-time is the smallest on-time that can be controlled by the control circuit. In one embodiment, minimum on-time $T_{ONMIN}$ is approximately 600 nanoseconds. Under conditions where the control circuit cannot reduce the on-time further, a different parameter must be varied to regulate the output.

In one example, on-time $T_{ON}$ is estimated to be higher or lower than the minimum value $T_{ONMIN}$ on the basis of a feedback signal. An estimate of $T_{ON}$ lower than $T_{ONMIN}$ implies a light load that demands a switching frequency within the range of audio frequencies. Under these conditions, decision block 620 finds that $T_{ONMIN} > T_{ON}$ and the flow is directed to block 630. Regulation is then accomplished with minimum-sum multi-cycle regulation in block 635.

As shown in block 635, minimum-sum multi-cycle modulation accomplishes regulation of the output by enabling N periods of switching in the switch signal, each having period $T_{SG}$, followed by no switching for M periods of $T_{SG}$. In the example, the sum of N and M is restricted to be greater than or equal to a minimum value K, where the value of K is chosen to meet the performance requirements of the intended application. In the example, minimum-sum multi-cycle modulation in accordance with the teachings of the present invention avoids the generation of undesirable audio frequencies while allowing the power supply to meet requirements of cost, efficiency, and output regulation.

If the decision block 620 finds that $T_{ONMIN} \leq T_{ON}$, then the flow is directed to a block 625 so that regulation is accomplished with fixed frequency pulse width modulation. In one example, minimum-sum multi-cycle modulation may be used to regulate the delivery of low output power, and fixed frequency pulse width modulation may be used to regulate the delivery of higher output power in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power supply controller configured to regulate an output of a power supply by enabling and disabling switching periods defined by an oscillator, the power supply controller comprising:
   an error signal generator coupled to generate an error signal in response to a feedback signal and a reference signal;
   a multi-cycle modulation circuit coupled to respond to a first disabled switching period by generating a skip mask signal, which when active defines a skip mask having a duration of a first number of switching periods,
      wherein while the skip mask signal is active the power supply is allowed to transition from the first or another disabled switching period to an enabled switching period, and
      wherein while the skip mask signal is active the power supply is prevented from transitioning from an enabled switching period to a disabled switching period; and
   a control circuit that includes the multi-cycle modulation circuit, wherein the control circuit is coupled to generate a drive signal in response to the error signal, wherein the control circuit is coupled to generate:
      at relatively higher loads, a pulse width modulated drive signal with varying on-time, and
      at relatively lighter loads, the drive signal with a fixed on-time and a fixed switching period.

2. The power supply controller of claim 1, wherein the multi-cycle modulation circuit is coupled to generate the skip mask signal only in response to the first disabled switching period that is a duration greater than the first number of switching periods from a previously generated skip mask signal.

3. The power supply controller of claim 1, further comprising a signal separator configured to extract a sensed input voltage and a sensed output voltage from a voltage on a bias winding.

4. The power supply controller of claim 1, wherein the control circuit is further coupled to generate:
   at relatively higher loads, a peak current pulse width modulation drive signal with a fixed frequency, and
   at relatively lighter loads, the drive signal with a fixed frequency and a fixed peak current.

5. The power supply controller of claim 1, wherein the control circuit is further coupled to generate:
   at relatively higher loads, a period modulated drive signal, and
   at relatively lighter loads, the drive signal with a fixed frequency.

6. The power supply controller of claim 1, wherein the multi-cycle modulation circuit further comprises:
   a latch to output the skip mask signal when set; and
   a counter coupled to be clocked in response to a clock signal output by the oscillator, wherein the clock signal defines the switching periods and the counter is coupled to reset the latch in response to counting the first number of switching periods.

7. The power supply controller of claim 1, wherein the control circuit includes a current limit circuit coupled to generate a variable current limit signal to regulate the output of the power supply, the current limit circuit coupled to terminate an on-time interval of each cycle of the drive signal in response to a current sense signal and the variable current limit signal.

* * * * *